United States Patent
Chuang

(10) Patent No.: US 8,817,874 B2
(45) Date of Patent: *Aug. 26, 2014

(54) METHOD AND SYSTEM FOR DETERMINING PREDICTION MODE PARAMETER

(75) Inventor: Eric Chuang, Taipei (TW)

(73) Assignee: Via Technologies, Inc., Taipei (TW)

( * ) Notice: Subject to any disclaimer, the term of this patent is extended or adjusted under 35 U.S.C. 154(b) by 1190 days.

This patent is subject to a terminal disclaimer.

(21) Appl. No.: 12/203,413

(22) Filed: Sep. 3, 2008

(65) Prior Publication Data

US 2009/0060037 A1 Mar. 5, 2009

(30) Foreign Application Priority Data

Sep. 5, 2007 (TW) .............................. 96132972 A

(51) Int. Cl.
*H04N 7/26* (2006.01)
*G06K 9/36* (2006.01)

(52) U.S. Cl.
CPC ............. *H01N 7/50* (2013.01); *H04N 7/26122* (2013.01); *H04N 7/26026* (2013.01); *H04N 7/26244* (2013.01)
USPC ...................................... 375/240.12; 382/238

(58) Field of Classification Search
USPC ............ 375/240.03, 240.12, 240.16; 382/166
IPC ..................................... H04N 7/26; G06K 9/36
See application file for complete search history.

(56) References Cited

U.S. PATENT DOCUMENTS

| | | | |
|---|---|---|---|
| 7,289,562 B2 * | 10/2007 | Yan et al. | 375/240.03 |
| 7,310,374 B2 * | 12/2007 | Wang et al. | 375/240.16 |
| 2003/0223645 A1 | 12/2003 | Sun et al. | |
| 2003/0231795 A1 | 12/2003 | Karczewicz | |
| 2005/0265447 A1 | 12/2005 | Park | |
| 2006/0013498 A1 | 1/2006 | Kim et al. | |
| 2006/0029282 A1 | 2/2006 | Meeker | |
| 2006/0133494 A1 * | 6/2006 | Saxena et al. | 375/240.16 |
| 2008/0123947 A1 * | 5/2008 | Moriya et al. | 382/166 |

FOREIGN PATENT DOCUMENTS

WO 03101117 A1 12/2003

OTHER PUBLICATIONS

Wang, Chen et al, "The Enhanced H.264 Intra Prediction," Journal of Shanghaijiaotong University Article No. 100 1006-2467 (2006) 05-0717-07.

* cited by examiner

*Primary Examiner* — Y Lee
*Assistant Examiner* — Richard Carter
(74) *Attorney, Agent, or Firm* — Kirton McConkie; Evan R. Witt

(57) ABSTRACT

For determining a prediction mode parameter, a macroblock of an image is divided into a plurality of blocks; most prediction mode parameters corresponding to a plurality of first blocks along a left most edge of the macroblock are determined; most prediction mode parameters corresponding to a plurality of second blocks along a top most edge of the macroblock are determined; and the most prediction mode parameters of the first and second blocks are stored into a buffer allocated with designated position for the plurality of blocks.

15 Claims, 3 Drawing Sheets

METHOD AND SYSTEM FOR DETERMINING PREDICTION MODE PARAMETER

FIELD OF THE INVENTION

The present invention relates to method and system for determining a prediction mode parameter applied in a digital image decoding process.

BACKGROUND OF THE INVENTION

The concept of video compression is to omit certain data of an image that are imperceptible to human's eyes, i.e. so-called visual redundancy. The data to be omitted are generally similar to other data in space or time dimension, and thus can be removed according to a compression algorithm. H.264/AVC is one of the mainstream standards of video compression. Compared with conventional digital video compression standards, such as MPEG-2, MPEG-4 or H.263, H.264 exhibits higher compression performance, and nevertheless reaches better image quality under the same compression ratio.

The coding mechanism of H.264/AVC compression is block-based. In brief, an image frame is divided into a plurality of rectangular areas called as macroblocks (MB). The macroblocks are then encoded. First, intra-frame prediction and inter-frame prediction techniques are applied to remove the similarities between images so as to obtain the so-called residual differences. Then the residual differences are spatially transformed and quantized to remove the visual redundancy. For the intra-prediction of H.264/AVC, three types are provided: intra_4×4, intra_8×8 and intra 16×16. For intra_4×4, the basic unit is a Luma 4×4 sub-block. Upon finding a reference predictor, the residual image is obtained by subtracting the original image with the reference predictor then applied with transformation. The prediction mode for finding the reference predictor may lie in 9 different directions, denoted as prediction mode 0~8 as shown in FIG. 1A. Prediction mode 2 represents a DC mode, which means no change exists between images.

Therefore, during the H.264/AVC decoding process, a decoder needs to find a prediction mode parameter that represents the prediction mode of a block. Because various decoding algorithms may be used, the decoder must determine the prediction mode parameters of the blocks at the left of and upper to the block being processed so as to determine the prediction mode parameter of the block. A conventional method for determining the prediction mode parameter of a given block is described as follows.

Referring to FIG. 1B, a plurality of macroblocks in H.264 is illustrated. Each macroblock is sub-divided into M×N blocks K11~Kmn.

FIG. 1C illustrates a 4×4 intra-MB being divided in to M×N blocks. Each of the macroblock is sub-divided into 16 blocks denoted as block 0~15. Each of the blocks contains 4×4 pixels. At first, a most possible prediction mode parameter (mostPredMode) of a given 4×4 block is determined according to the prediction mode parameters of the neighboring left and upper blocks. Then a previous intra prediction mode flag (pre_intra_pred_mode_flag) is inserted to the 4×4 block from the bit-stream. The length of pre_intra_pred_mode_flag is 1 bit. If pre_intra_pred_mode_flag is 1, then the prediction mode parameter of the given block is set to the most possible prediction mode parameter (mostPredMode). If the previous intra prediction mode flag is 0, another parameter remaining intra prediction mode (rem_intra_pred_mode) is also referenced. The rem_intra_pred_mode parameter is 3 bits in length. In the case that the rem_intra_pred_mode parameter is less than mostPredMode, the prediction mode parameter is set to the rem_intra_pred_mode parameter for the given block. In the case that the rem_intra_pred_mode parameter is larger than the mostPredMode parameter, the prediction mode parameter is set to (rem_intra_pred_mode parameter+1) for the given block. In addition, FIG. 1B also illustrates neighboring left and upper macroblocks A and B of the 16×16 macroblock respectively.

Referring back to FIG. 1B, it can be realized that the neighboring macroblocks A and B may or may not exist. Meanwhile, macroblocks A and B may be intra-MB or inter-MB, and they may be sub-divided into 4×4, 8×8 or 16×16 blocks. Consequently, the prediction mode parameters predA and predB of the neighboring left and upper blocks need to be determined prior to the determination of the prediction mode parameter for the given block. To obtain prediction mode parameters of the neighboring left and upper blocks, the following conditions are considered.

A DC prediction mode flag (dcPredModePredictedFlag) of the given block is set to 1 in the case that any of conditions is true:
1. The neighboring left macroblock A of the current macroblock does not exist;
2. The neighboring upper macroblock B of the current macroblock does not exist;
3. Macroblock A exists but is an inter-MB, and a constrained intra prediction flag (constrained_intra_pred_flag) corresponding to the given block is 1; and
4. Macroblock B exists but is an inter-MB, and a constrained intra prediction flag (constrained_intra_pred_flag) corresponding to the given block is 1.

For any of the 4 conditions being true, it indicates that the prediction mode parameter predA/predB of the neighboring left/upper macroblock A/B does not possess any reference value. Therefore, the prediction mode parameters predA and predB are both set to 2 (DC mode) for the given block when dcPredModePredictedFlag is set to 1.

In the case that none of the 4 conditions is true, (i.e. all false), the DC prediction mode flag (dcPredModePredictedFlag) of the given block is set to 0. The following determination is made subsequently.
1. predA is set to the 4×4 prediction mode parameter of the neighboring left macroblock A in the case that macroblock A is an intra-4×4 MB;
2. predA is set to the 8×8 prediction mode parameter of the neighboring left macroblock A in the case that macroblock A is an intra-8×8 MB;
3. predA is set to 2 in the case that the neighboring left macroblock A is neither intra-4×4 nor intra-8×8 MB;
4. predB is set to the 4×4 prediction mode parameter of the neighboring upper macroblock B in the case that macroblock B is an intra-4×4 MB;
5. predB is set to the 8×8 prediction mode parameter of the neighboring upper macroblock B in the case that macroblock B is an intra-8×8 MB; and
6. predB is set to 2 in the case that the neighboring macroblock B is neither intra-4×4 nor intra-8×8 MB.

"Intra-4×4 MB" denotes a macroblock that is an intra MB and subdivided into 4×4. "Intra-8×8 MB" denotes a macroblock that is an intra MB and subdivided into 8×8.

Once predA and pred B of the neighboring left and upper macroblocks are obtained, the procedure continues to steps below.

First, determine a most possible prediction mode parameter (mostPredMode) for the given block, which is the minimum value chosen from predA and predB, i.e.

MostPredMode=min (predA, predB).

Next, consider the previous intra prediction mode flag (pred_intra_pred_mode_flag) according to the following:
1. For pred_intra_pred_mode_flag=1,
   predMode=MostPredMode; and
2. For pred_intra_pred_mode_flag=0,
   a. predMode=rem_intra_pred_mode in the case that rem_intra_pred_mode corresponding to the given block is less than mostPredMode; or
   b. predMode=(rem-intra_pred_mode+1) in the case that rem_intra_pred_mode corresponding to the given block is larger than mostPredMode.

However, the processing procedure may be complex and time consuming if all of above steps are repeated for every block. Consequently the hardware resource is occupied. As a result, there exists the need to overcome such deficiency.

SUMMARY OF THE INVENTION

Therefore, the present invention provides simplified method and device for calculating a coded_block_flag parameter.

The present invention provides a method, performed by a decoder, for determining a prediction mode parameter in a digital image decoding process, wherein the method comprises receiving a digital image comprising a plurality of macroblocks; retrieving a first macroblock comprising M×N blocks K11~Kmn; performing a first operation on M blocks K11~Km1 along a first edge in a first direction to obtain corresponding M first parameters A11~Am1; performing a second logic operation on N blocks k11~K1$n$ along a second edge in a second direction to obtain corresponding N second parameters B11~B1$n$; performing a third logic operation on block K11 according to the parameters A11 and B11 to obtain a prediction mode parameter P11 corresponding to block K11; performing the third logic operation on further blocks of the first macroblock to obtain respective prediction mode parameters of corresponding blocks.

The present invention also provides a decoder system for determining a prediction mode parameter in a digital image decoding process, wherein the system comprises a block processing unit configured to receive a digital image comprising a plurality of macroblocks, a first macroblock of the digital image being divided into M×N blocks K11~Kmn; and a computation unit coupled to the block processing unit and configured to perform a first operation, a second logic operation and a third logic operation; wherein the first operation is configured to perform on M blocks K11~Km1 along a first edge in a first direction to obtain corresponding M first parameters A11~Am1; wherein the second logic operation is configured to perform on N blocks k11~K1$n$ along a second edge in a second direction to obtain corresponding N second parameters B11~B1$n$; and wherein the third logic operation is performed on block K11 according to the parameters A11 and B11 to obtain a prediction mode parameter P11 corresponding to block K11, and performed on further blocks of the first macroblock to obtain respective prediction mode parameters of corresponding blocks.

The present invention also provides a method of determining prediction mode parameter in H.264 decoding, wherein the method comprises: dividing a macroblock of an image into a plurality of blocks; determining most prediction mode parameters corresponding to a plurality of first blocks along a left most edge of the macroblock; determining most prediction mode parameters corresponding to a plurality of second blocks along a top most edge of the macroblock; and storing the most prediction mode parameters of the first and second blocks into a buffer allocated with designated position for the plurality of blocks.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described in more detail with reference to the following embodiments. It is to be noted that the following descriptions of preferred embodiments of this invention are presented herein for purpose of illustration and description only; it is not intended to be exhaustive or to be limited to the precise form disclosed.

Figure 1A:
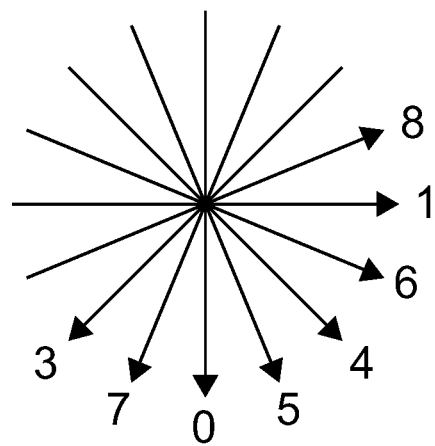
FIG. 1A is a scheme illustrating directions of a prediction mode.

As described above with reference to FIG. 1A~1C, a decoder needs to determine the prediction mode parameters of the neighboring left and upper blocks of a given block prior to the determination of the prediction mode parameter of the given block in H.264 decoding. However, it can be observed that determination of the prediction mode parameters for blocks such as 3, 6, 7, 9, 11, 12, 13, 14, 15 as shown in FIG. 1C does not require complex processing of the neighboring blocks. Based on this observation, the present invention provides an improvement over conventional methods. It is to be noted that the prior art of FIG. 1A~1C can be incorporated in the present invention as parts of embodiments, but for example, the length of pre_intra_pred_mode_flag is not limited to 1 bit, and the rem_intra_pred_mode parameter is not limited to 3 bits in length.

Referring to FIG. 2, a block diagram of a system for determining a prediction mode parameter according to an embodiment of the present invention is illustrated. The system comprises a block processing unit 201, a buffer 202 and a computation unit 203. The block processing unit 201 is configured to receive a digital image having a plurality of macroblocks (MB). Each of the macroblocks comprises M×N blocks K11~Kmn. Buffer 202 is configured to store information related to blocks K11~Kmn in corresponding locations. As is known that a prediction mode may direct in 9 directions, buffer 202 may equip with 64 bits in capacity, or can be configured as a buffer array having 16 units, each of the 16 units is 4 bits in capacity. The buffer array is denoted as mostPredMode[16].

Figure 3:
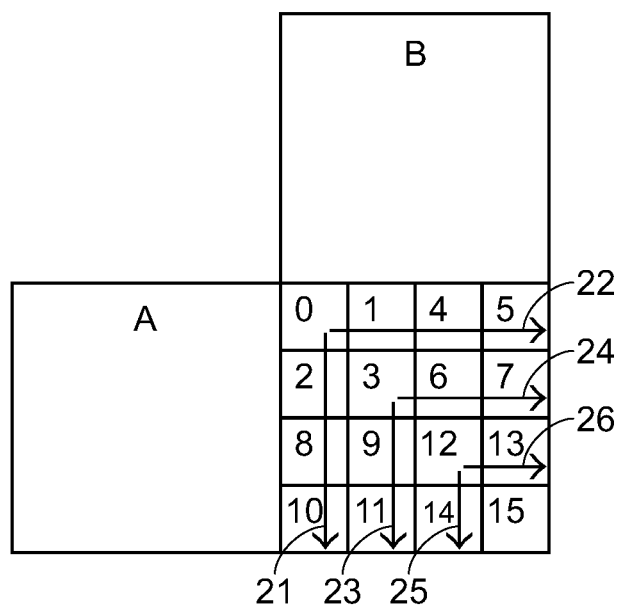
FIG. 3 is a scheme illustrating an exemplified sequence for determining the prediction mode parameters of the digital image of FIG. 1B and FIG. 1C.

The computation unit 203 is coupled to the block processing unit 201 and buffer 202, and is configured to perform various operations on the macroblocks. Each macroblock may comprise M×N blocks, such as block 0~15 as shown in FIG. 3. As described previously, for blocks lying within a macroblck, such as blocks 3, 6, 7, 9, 11, 12, 13, 14, 15, the determination of the prediction mode parameters of the neighboring left and upper blocks can be reduced without complex computation. However, for blocks on the left and top most edges of the current macroblock, such as blocks 0, 1, 2, 4, 5, 8, 10, the prediction mode parameters predA and predB of the neighboring left and upper macroblocks must be referenced. Therefore, the computation unit 203 of the present embodiment performs a first operation along a first edge in a first direction, says the left most edge, to obtain predA of blocks 0, 2, 8, 10 on the left most edge according to the prediction mode parameter of macroblock A. Then the computation unit 203 performs a second operation along a second edge in a second direction, says the top most edge of the current macroblock, to obtain predB of blocks 0, 1, 4, 5 on the top most edge according to the prediction mode parameter of macroblock B. At last, a third operation is performed on each block 0~15 to determine the respective prediction mode parameters and the determined values are stored in buffer 202 accordingly. Details of these operations will be described next.

Figure 1B:
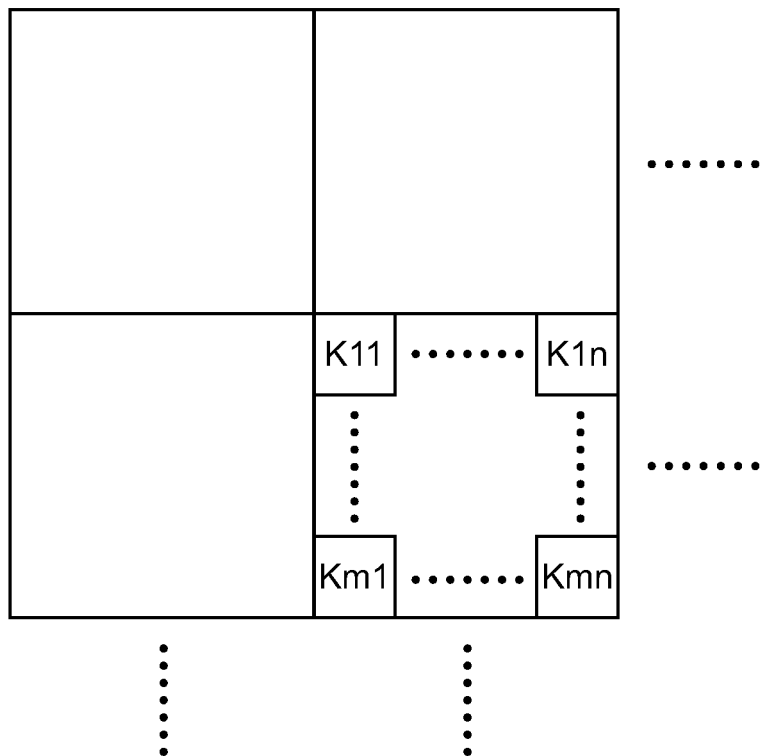
FIG. 1B is a scheme illustrating the division of a digital image into macroblocks and further smaller blocks in H.264.
Figures 1C, 2:
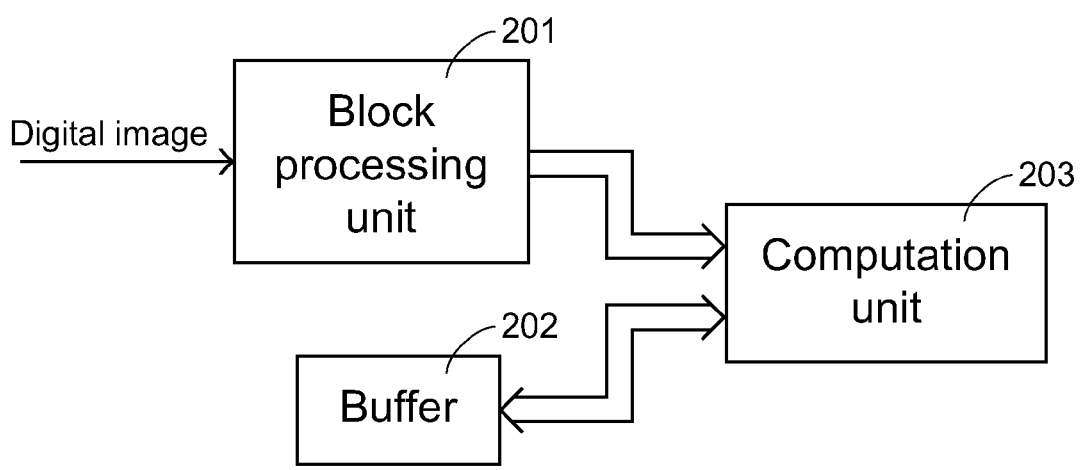
FIG. 1C is a scheme illustrating an intra_4×4 macroblock and neighboring macroblocks within a digital image.
FIG. 2 is a block diagram of a system for determining prediction mode parameters in a decoding process of a digital image according to an embodiment of the present invention.

Please refer to FIG. 1B and FIG. 3. The first operation is performed on M blocks K11~Km1 along the first edge in the first direction of the given macroblock to obtain M first parameters A11~Am1 (i.e. predA of blocks K11~Km1). In the present embodiment, the first edge is chosen as the left most edge having 4 blocks 0, 2, 8, 10. The resulting predA A11-Am1 are then written to the corresponding location in the buffer array 202. In the present embodiment, predA of block 0, 2, 8, 10 are written into the buffer array 202 at mostPredMode[0], mostPredMode[2], mostPredMode[8] and mostPredMode[10] respectively. Here the first operation can be the same as the conventional algorithm adapted in H.264 and hence will be omitted for simplicity. One with ordinary skill in the art may appreciate the underlying mechanism.

Next, the second operation is performed on N blocks K11~K1*n* along the second edge in the second direction of the given macroblock to obtain N second parameters (i.e. predB of blocks K11~K1*n*) A11~A1*n*. In the present embodiment, the second edge is chosen as the top most edge having 4 blocks 0, 1, 4, 5. The resulting predB parameters are written into the corresponding buffer array 202 at mostPredMode[0], mostPredMode[1], mostPredMode[4], mostPredMode[5] respectively.

The second operation performed on a given block includes the following steps, i.e.
mostPredMode[0, 1, 4, 5]=2 (i.e. predB of blocks 0, 1, 4, 5) if one of the below conditions is true:

1. the neighboring upper macroblock B of the current macroblock does not exist;
2. macroblock B exists but is an inter-MB, and the constrained intra prediction mode flag (constrained_intra_pred_flag) of the given block is set to 1; and
3. macroblock B is neither intra4×4 nor intra 8×8 MB.

In the case that none of the 3 conditions is true, the predB parameter of blocks 0, 1, 4, 5 is determined as below:

1. For block 0, mostPredMode[0] (i.e. predB of block 0) is updated with the minimum value between previous stored mostPredMode[0] (predA of block 0) and the prediction mode parameter of the block upper to block 0; and
2. For blocks 1, 4, 5, mostPredMode[1, 4, 5] (i.e. predB of blocks 1, 4, 5) is set to the prediction mode parameter of the block upper to blocks 1, 4, 5 respectively.

The second operation is much simplified than the conventional first operation due to the reason that in macroblock-adaptive frame/field (MBAFF) encoding, H.264 is more flexible about the format of the neighboring left macroblock. In order to cope with the variety, the first operation adapts the conventional method. However, for an embodiment that needs only to meet baseline requirement without using full MBAFF encoding, the first operation can be simplified in the same way as the second operation so as to reach fast computation.

After the first and second operations are completed, the most possible prediction mode of block 0 is obtained. The computation unit 203 performs the third operation in order to determine the prediction mode parameter of block 0, 1, 2, and so on. The order of the blocks may start from the top-left block of the macroblock (i.e. block 0 as shown in FIG. 3). Once the prediction mode parameter of block 0 is determined, blocks that needs to reference predMode(0) can be determined subsequently. In the embodiment of FIG. 3, blocks 2, 8, 10 along direction 21 are processed next, then blocks 1, 4, 5 along direction 22.

In the embodiment of FIG. 3, prediction mode parameters are determined in the order from direction 21, 22, 23, . . . , to 26. However, other embodiments may adapt different orderings without departing from the spirit of the present invention. The order of the computation unit 203 is arranged such that the neighboring left and upper blocks of a given block must be determined prior to the given block for the third operation. The third operation takes advantage of the results stored in the buffer array mostPredMode[16] of prior operations. For example, block 3 is processed after blocks 1 and 2 since block 3 needs to reference parameters of block 1 and 2, and block 12 is processed after blocks 6 and 9. By referencing values already stored in the buffer array 202, no additional computation is necessary for finding the prediction mode parameters of the neighboring left and upper blocks. Instead, these parameters can be accessed directly from the buffer array while saving computation and improving overall efficiency.

Referring again to FIG. 3, in the case that the previous intra prediction mode flag (pre_intra_pred_mode_flag) of block 0 is set to 1, the prediction mode parameter of block 0 is set to the value stored in mostPredMode[0], and no update is required.

In the case that pre_intra_pred_mode_flag=0, the following determination is made:

1. predMode(0)=rem_intra_pred_mode if rem_intra_pred_mode corresponding to block 0 is less than the value stored in mostPredMode[0]; and
2. predMode(0)=rem_intra_pred_mode+1 if rem_intra_pred_mode corresponding to block 0 is larger than the value stored in mostPredMode[0].

Meanwhile, predA for blocks 2, 8, 10 and predB for block 1, 4, 5 are obtained and stored in the buffer array mostPredMode[16] after the first and second operations are completed. The prediction mode parameters of the remaining blocks are then determined along directions 21, 22 and so on. The prediction mode parameters of blocks 2, 8, 10 in direction 21 are determined based on the prediction mode parameter of block 0 and predA of blocks 2, 8, 10 stored in mostPredMode[2, 8, 10] respectively. Also, the prediction mode parameter of blocks 1, 4, 5 in direction 22 are determined based on the prediction mode parameter of block 0 and predB of block 1, 4, 5 stored in mostPredMode[1, 4, 5] respectively.

Once the prediction mode parameters of blocks on the left and top most edge (aligned in directions 21 and 22) of the macroblock are determined, the remaining blocks need not perform operations to determine their predA or predB. For blocks 3, 6, 7, 9, 11, 12, 13, 14, 15 in the present embodiment, the prediction mode parameters of these blocks can be determined along directions 23, 24, 25, 26 by use of previously determined prediction mode parameters in subsequence.

In another embodiment of the present invention, an update flag dcPredModePredictedFlag is assigned to blocks 0, 1, 2, 4, 5, 8, 10 respectively in order to prevent error determination. This flag represents that no update should be performed to the corresponding buffer array location mostPredMode[16] of the block. dcPredModePredictedFlag is set to 1 in response to any of the following conditions being true:

1. The neighboring left macroblock A does not exist;
2. The neighboring upper macroblock B does not exist;
3. Macroblock A exists but is an inter-MB, and the constrained_intra_opred_flag corresponding to the current block is set to 1; and
4. Macroblock B exists but is an inter-MB, and the constrained_intra_opred_flag corresponding to the current block is set to 1.

When dcPredModePredictedFlag of a given block is set to 1, the value of mostPredMode[16] corresponding to the given block can no longer be changed. For example, mostPredMode [0] is set to 2 due to a fact that the neighboring left block of block 0 does not exist. In such case, the prediction mode parameter of block 0 is determined as 2. However, if no such dcPredModePredictedFlag can be referenced, the prediction mode parameter of block 0 may be possibly changed to the minimum value between the value stored in mostPredMode [0] and the prediction mode parameter of the neighboring upper block of block 0. This will result in the prediction mode parameter of block 0 to be changed to a false value. By utilizing dcPredModePredictedFlag, the problem of error determination can be avoided.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method, performed by a decoder, for determining a prediction mode parameter in a digital image decoding process, the method comprising:

receiving a digital image comprising a plurality of macroblocks;

retrieving a first macroblock comprising M×N blocks K11 through Kmn;

performing a first operation on M blocks K11 through Km1 of the M×N blocks K11 through Kmn along a first edge in a first direction to obtain corresponding M first parameters A11 through Am1, wherein while performing the first operation, a first set of conditions are taken in consideration for judgment as whether a neighboring macroblock A next to the first edge of the first macroblock exists, the macroblock A exists but whether there is an inter-MB and a constrained intra prediction flag corresponding to the M blocks is 1, and the macroblock A exists but whether there is neither intra-4×4 nor intra-8×8 MB;

performing a second logic operation on N blocks K11 through K1n of the M×N blocks K11 through Kmn along a second edge in a second direction to obtain corresponding N second parameters B11 through B1n, wherein while performing the second operation, a second set of conditions are taken in consideration for judgment as whether a neighboring macroblock B next to the second edge of the first macroblock exists, the macroblock B exists but whether there is an inter-MB and a constrained intra prediction flag corresponding to the N blocks is 1, and the macroblock B exists but whether there is neither intra-4×4 nor intra-8×8 MB;

performing a third logic operation on blocks K11, K21 through Km1 and K12 through K1n of the M×N blocks K11 through Kmn referencing the parameters A11 through Am1 and B11 through B1n to obtain prediction mode parameters-corresponding to blocks K11, K21 through Km1 and K12 through K1n, and thereby the prediction mode parameters corresponding to blocks K11, K21 through Km1 and K12 through K1n are obtained by taking the first and second sets of conditions in consideration for judgment; and performing the third logic operation on the remaining blocks of the M×N blocks K11 through Kmn of the first macroblock directly referencing the prediction mode parameters corresponding to blocks K21 through Km1 and K12 through K1n to obtain respective prediction mode parameters of the remaining blocks, and thereby the prediction mode parameters of the remaining blocks are obtained without the need of taking the first and second sets of conditions in consideration for judgment.

2. The method according to claim 1, wherein the first edge is the left most edge and the second edge is the top most edge of the first macroblock.

3. The method according to claim 1, further comprising:
providing a buffer having 4×M×N bits in capacity; and
storing the parameters into corresponding positions in the buffer.

4. The method according to claim 1, wherein the second logic operation for a given block comprises:
setting the second parameter of the given block to a dc value in response to one of the second set of conditions being true:
a) the neighboring macroblock B next to the second edge of the first macroblock does not exist;
b) the macroblock B exists but is an inter-MB, and a constrained intra prediction mode flag corresponding to the N blocks is 1; and
c) the macroblock B is neither intra_4×4 nor intra_8×8; and
setting the second parameter of the given block to the prediction mode parameter of a neighboring block next to the given block, in response to none of the conditions a) through c) being true.

5. The method according to claim 4, wherein the first logic operation is the same as the second logic operation in response to macroblock adaptive frame/field encoding not being used.

6. The method according to claim 1, wherein the prediction mode parameter of block K11 is determined by:
setting a most possible prediction mode parameter corresponding to block K11 to the minimum value between the first parameter A11 and second parameter B11 corresponding to block K11; and
determining the prediction mode parameter P11 of block K11 according to the most possible prediction mode parameter, a previous intra prediction mode flag and a remaining intra prediction mode parameter.

7. The method according to claim 1, further comprising:
assigning an update flag to each of the blocks K11 through Kmn; and
stopping updating a corresponding value stored in the buffer in response to the update flag related to a given block being set.

8. A decoder system for determining prediction mode parameter in digital image decoding process, the system comprising:
- a block processing unit configured to receive a digital image comprising a plurality of macroblocks, a first macroblock of the digital image being divided into M×N blocks K11 through Kmn; and
- a computation unit coupled to the block processing unit and configured to perform a first operation, a second logic operation and a third logic operation;
- wherein the first operation is performed on M blocks K11 through Km1 of the M×N blocks K11 through Kmn along a first edge in a first direction to obtain corresponding M first parameters A11 through Am1, wherein while performing the first operation, a first set of conditions are taken in consideration for judgment as whether a neighboring macroblock A next to the first edge of the first macroblock exists, the macroblock A exists but whether there is an inter-MB and a constrained intra prediction flag corresponding to the M blocks is 1, and the macroblock A exists but whether there is neither intra-4×4 nor intra-8×8 MB;
- wherein the second logic operation is performed on N blocks k11 through K1n of the M×N blocks K11 through Kmn along a second edge in a second direction to obtain corresponding N second parameters B11 through B1n, wherein while performing the second operation, a second set of conditions are taken in consideration for judgment as whether a neighboring macroblock B next to the second edge of the first macroblock exists, the macroblock B exists but whether there is an inter-MB and a constrained intra prediction flag corresponding to the N blocks is 1, and the macroblock B exists but whether there is neither intra-4×4 nor intra-8×8 MB; and
- wherein the third logic operation is performed on blocks K11, K21 through Km1 and K12~K1n of the M×N blocks K11 through Kmn referencing the parameters A11 through Am1 and B11 through B1n to obtain-prediction mode parameters-corresponding to blocks K11, K21 through Km1 and K12 through K1n and thereby the prediction mode parameters corresponding to blocks K11, K21 through Km1 and K12 through K1n are obtained by taking the first and second sets of conditions in consideration for judgment, and performed on the remaining blocks of the M×N blocks K11 through Kmn of the first macroblock directly referencing the prediction mode parameters corresponding to blocks K21 through Km1 and K12 through K1n to obtain respective prediction mode parameters of the remaining blocks, and thereby the prediction mode parameters of the remaining blocks are obtained without the need of taking the first and second sets of conditions in consideration for judgment.

9. The system according to claim 8, wherein the first edge is the left most edge and the second edge is the top most edge of the first macroblock.

10. The system according to claim 8, further comprising a buffer coupled to the computation unit and having 4×M×N bits in capacity, wherein the parameters A11 through Amn are stored in corresponding positions within the buffer.

11. The system according to claim 8, wherein the second logic operation for a given block comprises:

setting the second parameter of the given block to a dc value in response to one of the second set of conditions being true:
- a) the neighboring macroblock B next to the second edge does not exist;
- b) the macroblock B exists but is an inter-MB and a constrained intra prediction mode flag corresponding to the N blocks is 1; and
- c) the macroblock next to the second edge is neither intra__4×4 nor intra__8×8; and setting the second parameter of the given block to the prediction mode parameter of a neighboring block next to the given block in response to none of the conditions a) through c) being true.

12. The system according to claim 11, wherein the first logic operation is the same as the second logic operation if macroblock adaptive frame field encoding is not used.

13. The system according to claim 8, wherein the third logic operation for a given block comprises:
- determining the prediction mode parameter of the given block according to a most possible prediction mode parameter, a previous intra prediction mode flag and a remaining intra prediction mode parameter.

14. The system of claim 8, wherein each of the blocks K11 through Kmn is assigned with an update flag, and the value stored in a corresponding position of the buffer is not allowed to be updated in response to the update flag being set.

15. A method of determining a prediction mode parameter in H.264 decoding, the method comprising:
- dividing a macroblock of an image into a plurality of blocks M×N;
- performing first and second logic operations on M blocks K11, K21 through Km1 and on N blocks K11, K12 through K1n of the plurality of blocks M×N at the left most and top most edges of the macroblock by judging conditions (a) through (f) that:
  - (a) whether a neighboring macroblock A next to the left most edge of the macroblock exists,
  - (b) the macroblock A exists but whether there is an inter-MB and a constrained intra prediction flag corresponding to the M blocks is 1,
  - (c) the macroblock A exists but whether there is neither intra-4×4 nor intra-8×8 MB,
  - (d) whether a neighboring macroblock B next to the top most edge of the macroblock exists,
  - (e) the macroblock B exists but whether there is an inter-MB and a constrained intra prediction flag corresponding to the N blocks is 1, and
  - (f) the macroblock B exists but whether there is neither intra-4×4 nor intra-8×8 MB;
- performing a third logic operation on blocks K11, K21 through Km1 and K12 through K1n of the M×N blocks referencing parameters of the A and B macroblock to obtain the prediction mode parameter by judging the conditions (a) through (f); and
- performing the third logic operation on the remaining blocks of the M×N block directly referencing the prediction mode parameters corresponding to blocks K21 through Km1 and K12 through K1n to obtain respective prediction mode parameters of the remaining blocks without the need of judging the conditions (a) through (f).

* * * * *